United States Patent [19]
Etter

[11] 3,800,830

[45] Apr. 2, 1974

[54] METERING VALVE

[76] Inventor: Berwyn E. Etter, 10355 Paradise Blvd., Treasure Island, Fla. 33740

[22] Filed: Jan. 11, 1973

[21] Appl. No.: 322,754

[52] U.S. Cl............ 137/625.41, 137/625.47
[51] Int. Cl............................. F16k 11/00
[58] Field of Search..... 137/625.41, 625.48, 625.47, 137/625.49; 251/309, 310, 311, 312

[56] References Cited
UNITED STATES PATENTS

| | | | |
|---|---|---|---|
| 3,122,168 | 2/1964 | Wright............................ | 137/625.48 |
| 1,977,181 | 10/1934 | Foresman................... | 137/625.47 X |
| 2,332,882 | 10/1943 | Abbatiello................. | 137/625.47 X |
| 2,645,450 | 7/1953 | Chessman.................. | 137/625.48 X |
| 2,960,086 | 11/1960 | Keller......................... | 137/625.47 X |
| 3,332,432 | 7/1967 | Marsh............................ | 251/328 X |
| 3,347,260 | 10/1967 | Lewis, Sr. et al.......... | 137/625.48 X |
| 3,570,540 | 3/1971 | McInnes et al.............. | 137/625.48 |
| 3,684,187 | 8/1972 | Etter........................... | 137/625.47 X |
| 3,698,439 | 10/1972 | Kolinsky................... | 137/625.48 |

Primary Examiner—Samuel Scott
Attorney, Agent, or Firm—Zarley, McKee & Thomte

[57] ABSTRACT

A metering valve for metering or mixing either liquid or gases of different types is disclosed herein. The valve comprises a body portion having a chamber formed therein. A metering valve is rotatably mounted in the chamber and has a plurality of spaced apart valve elements rotatably mounted therein which have peripheral skirt portions provided thereon with a plurality of spaced apart passageways extending therethrough. A plurality of inlet conduits are in communication with the passageways formed in the valve elements and are in communication with sources of different liquids or gases. A plurality of outlet conduits are in communication with the passageways formed in the valve elements. The arrangement of the valve elements and the passageways formed therein is such that all of the gases or liquids in the inlet conduits may be mixed and so that any of the gases or liquids can be excluded from the final mixture. Any combination of gases or quantities of gases may be achieved through the selective rotation of the valve elements.

7 Claims, 4 Drawing Figures

METERING VALVE

BACKGROUND OF THE INVENTION

This invention relates to a metering valve and more particularly to a metering valve adapted to mix either liquids or gases of different types. Prior metering valves do not have the capability of mixing several types of liquids or gases nor do the prior metering valves have the capability of excluding one or more of a plurality of liquids or gases from the final mixture.

Therefore, it is a principal object of the invention to provide an improved metering valve.

A further object of the invention is to provide a metering valve which may be used for mixing either liquids or gases of different types.

A further object of the invention is to provide a metering valve which may be used to mix different types of liquids or gases in varying proportions.

A further object of the invention is to provide a metering valve which is versatile.

A further object of the invention is to provide a metering valve which is economical to manufacture and durable in use.

These and other objects will be apparent to those skilled in the art.

BRIEF DESCRIPTION OF THE DRAWINGS

This invention consists in the construction, arrangements, and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figures 1, 2:
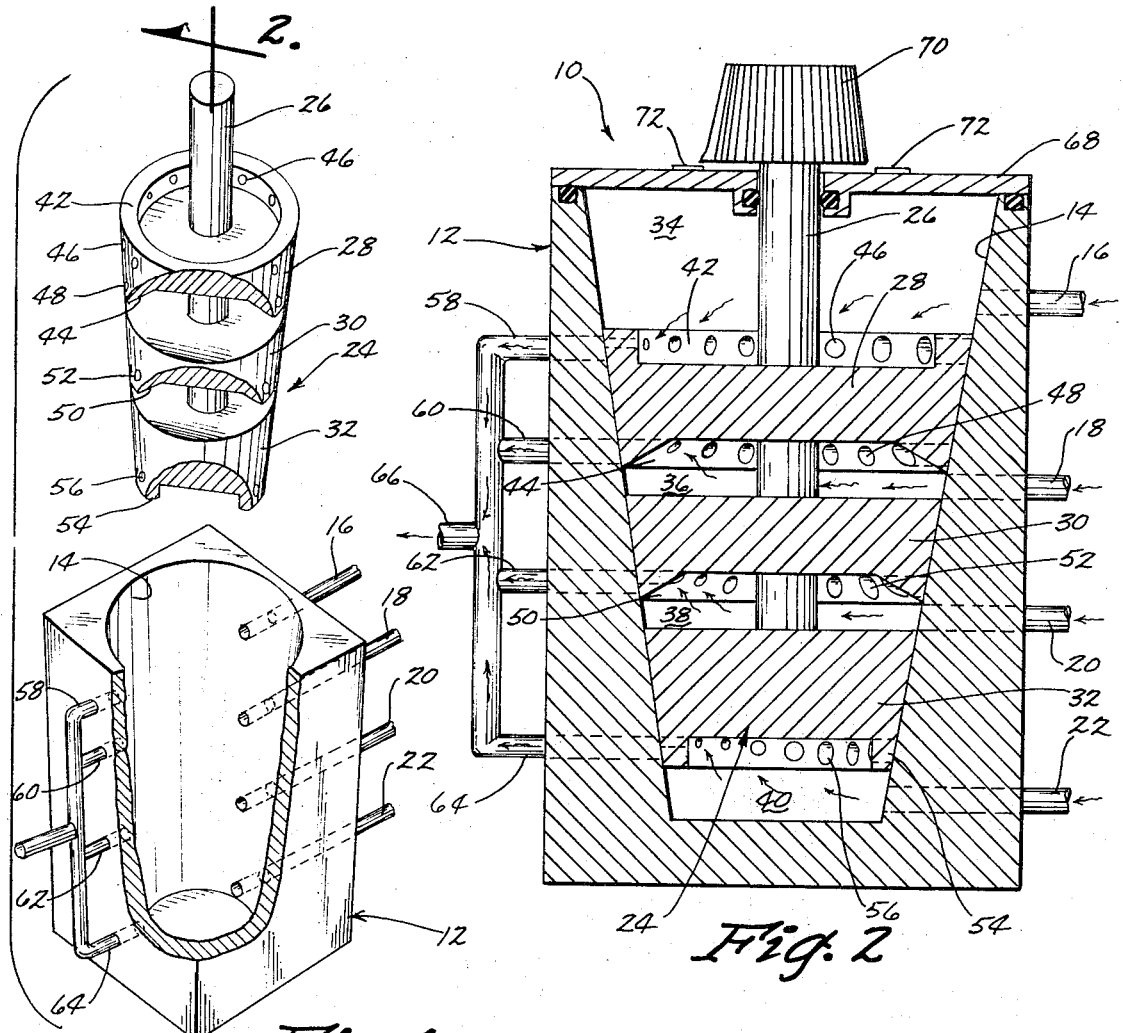
FIG. 1 is an exploded perspective view of a portion of the metering valve.
FIG. 2 is an enlarged sectional view seen along lines 2 — 2 of FIG. 1.
Figures 3, 4:
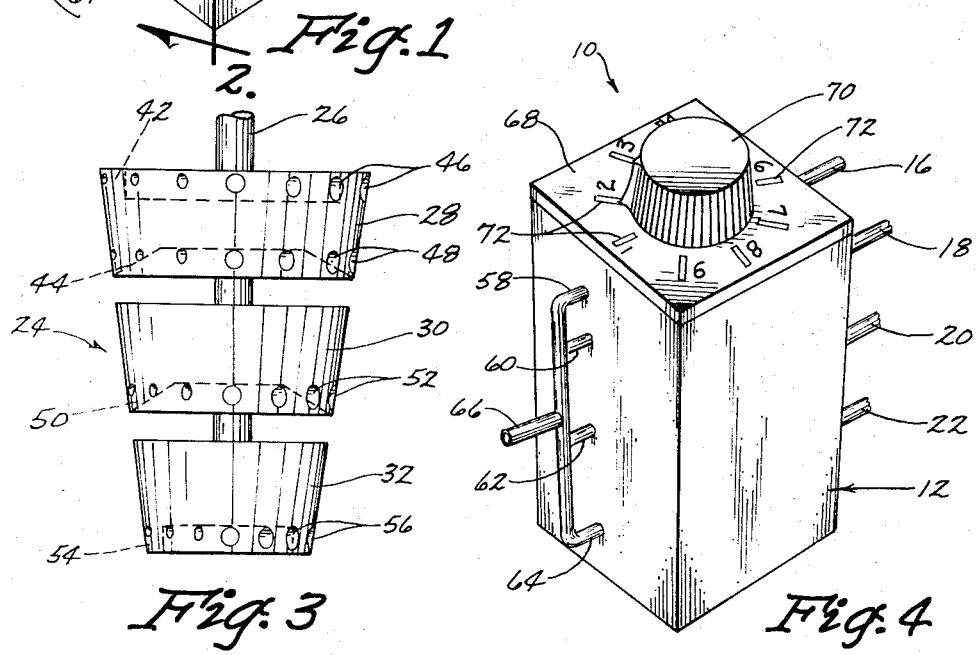
FIG. 3 is a side view of the valve member.
FIG. 4 is a perspective view of the metering valve.

The metering valve of this invention is referred to generally by the reference numeral 10. Metering valve 10 comprises a housing or body 12 having a tapered chamber 14 extending downwardly thereinto as seen in the drawings. Inlet conduits 16, 18, 20 and 22 are in communication with the chamber 14 as seen in FIG. 2. Valve means 24 is rotatably mounted in chamber 14 and generally comprises a rotatable shaft 26 having valve elements 28, 30 and 32 secured thereto for totation therewith. As seen in FIG. 2, valve elements 28, 30 and 32 are in a spaced apart relationship so as to define chamber portions 34, 36, 38 and 40. Inlet conduits 16, 18, 20 and 22 are in communication with the chamber portions 34, 36, 38 and 40 respectively.

Valve element 28 is provided with a pair of peripheral skirt portions 42 and 44 which have a plurality of passageways 46 and 48 extending therethrough respectively. Extending around the skirt 42, the openings or passageways 46 progressively increase in diameter. Likewise, the passageways or openings 48 in skirt 44 progressively increase in diameter.

Valve member 30 is provided with a lower skirt portion 50 which has a plurality of passageways 52 formed therein. Valve element 32 has a lower skirt portion 54 which has a plurality of passageways 56 formed therein and extending therethrough. Extending around the skirt portions 50 and 54, the passageways 52 and 56 progressively increase in diameter.

Outlet conduits 58, 60, 62 and 64 communicate with the passageways 46, 48, 52 and 56 respectively as illustrated in FIG. 2. The outlet conduits 58, 60, 62 and 64 communicate with each other and have a conduit 66 extending therefrom. The numeral 68 refers to a cover provided at the upper end of the housing 12 for sealing chamber 14 from the atmosphere. A knob 70 is provided on the upper end of the shaft 26 for controlling the selective rotation of the valve elements. Cover 68 is provided with indicia marks 72 thereon to permit the operator to rotate the knob 70 to the desired position so as to achieve the desired mixing or metering of the liquids or gases.

In operation, the inlet conduits would be in communication with four different gases such as propane, natural gas, industrial gas, oxygen, etc. For purposes of description, the inlet conduits will be described as being in communication with gases A, B, C and D. Any number of valve settings may be achieved with the metering valve to accomplish the desired metering or mixing of the various gases. For example, setting No. 1 might combine gases A and C while setting No. 2 might also combine gases A and C but in smaller quantities than for setting No. 1. Setting No. 3 might introduce three different gases while setting No. 4 might introduce four different gases. In other words, the metering valve of this invention permits different types of gases to be mixed in selected proportions. The design of the valve is such that the valve elements prevent communication from chamber portion to chamber portion so that the proper gas will be mixed in the proper proportion. The gases enter the valve and exit therefrom as illustrated by the arrows in FIG. 2.

Thus it can be seen that a metering valve has been provided which permits a much greater number of gases or liquids to be mixed or metered in varying proportions than has been heretofore possible. The metering valve therefore accomplishes at least all of its stated objectives.

I claim:

1. A metering valve comprising,
   a body portion having a chamber,
   a plurality of inlet conduits communicating with said chamber,
   a plurality of outlet conduits communicating with said chamber,
   a metering valve means rotatably mounted in said chamber and having a plurality of valve elements mounted thereon,
   each of said valve elements having a plurality of radially extending passageways formed therein adapted to provide selective communication between said inlet and outlet conduits, the passageways in each of said valve elements having progressively increasing cross-sectional areas.

2. The metering valve of claim 1 wherein said passageways are formed in said valve elements to prevent the product in at least one of said inlet conduits from being supplied to the respective outlet conduit.

3. The metering valve of claim 2 wherein at least first, second and third inlet conduits are in communication with said chamber and wherein at least first, second and third outlet conduits are in communication with said chamber, said metering valve means comprising at least first, second and third valve elements.

4. A metering valve comprising,
a body portion having a chamber,
a plurality of inlet conduits communicating with said chamber,
a plurality of outlet conduits communicating with said chamber,
a metering valve means rotatably mounted in said chamber and having a plurality of valve elements mounted thereon, said valve elements having a plurality of radially extending passageways formed therein adapted to provide selective communications between said inlet and outlet conduits,
at least first, second, third and fourth inlet conduits in communication with said chamber,
at least first, second, third and fourth outlet conduits in communication with said chamber,
said metering valve means comprising first, second and third valve elements rotatably mounted in said chamber defining first, second, third and fourth chamber portions which are in communication with said first, second, third and fourth inlet conduits respectively,
said first valve element comprising a pair of spaced apart peripheral skirt portions having said passageways extending therethrough,
said passageways in said pair of peripheral skirt portions being in selective communication with said first and second outlet conduits respectively,
said second valve element having a peripheral skirt portion having said passageways extending therethrough which are in selective communication with said third outlet conduit,
said third valve element having a peripheral skirt portion having said passageways extending therethrough which are in selective communication with said fourth outlet conduit.

5. The metering valve of claim 4 wherein said passageway in said skirt portions are formed to permit the selective exclusion of at least one of the products in said inlet conduits.

6. The metering valve of claim 5 wherein all of said outlet conduits are in communication with each other outwardly of said chamber.

7. A metering valve comprising,
a body portion having a chamber,
a plurality of inlet conduits communicating with said chamber,
a plurality of outlet conduits communicating with said chamber,
a plurality of outlet conduits communicating with said chamber,
a metering valve means rotatably mounted in said chamber and having a plurality of valve elements mounted thereon, said valve elements having a plurality of radially extending passageways formed therein adapted to provide selective communication between said inlet and outlet conduits,
said passageways being formed in said valve elements to prevent the product in at least one of said inlet conduits from being supplied to the respective outlet conduit,
at least first, second and third inlet conduits in communication with said chamber,
at least first, second and third outlet conduits in communication with said chamber,
said metering valve means comprising at least first, second and third valve element,
said valve means comprising a rotatable shaft having said valve elements mounted thereon for rotation therewith, said valve elements being mounted on said shaft in a spaced apart relationship thereby defining at least first, second and third chamber portions, said first, second and third inlet conduits being in communication with first, second and third chamber portions respectively, each of said valve elements having a peripheral skirt portion, said passageways extending through said skirt portions for selective communication with said outlet conduits.

* * * * *